United States Patent

[11] 3,557,358

| [72] | Inventor | Guy L. Fougere |
| | | Lincoln, Mass. |
| [21] | Appl. No. | 775,705 |
| [22] | Filed | Nov. 14, 1968 |
| [45] | Patented | Jan. 19, 1971 |
| [73] | Assignee | I-T-E Imperial Corporation |
| | | Chicago, Ill. |
| | | a corporation of Delaware. by mesne assignments |

[54] FLUID INTEGRATING DEVICE
8 Claims, 8 Drawing Figs.

[52] U.S. Cl. .................................................. 235/200, 73/231, 235/201
[51] Int. Cl. ................................................. G06d 1/02
[50] Field of Search ..................................... 235/200, 201; 73/229, 230, 231; 58/42

[56] References Cited
UNITED STATES PATENTS
| 1,058,121 | 4/1913 | Weller.......................... | 73/230 |
| 1,365,547 | 1/1921 | Tesla............................ | 73/229 |
| 1,597,334 | 8/1926 | Wilkinson .................... | 73/229 |
| 2,004,909 | 6/1935 | Benson......................... | 58/46 |
| 3,174,337 | 3/1965 | Smith........................... | 73/229 |
| 3,364,342 | 1/1968 | Jakubowski.................. | 235/201 |

*Primary Examiner*—Richard B. Wilkinson
*Assistant Examiner*—Lawrence R. Franklin
*Attorney*—Hofgren, Wegner, Allen, Stellman & McCord ABSTRACT: A fluid integrating device including a magnetically suspended disc mounted for rotation about a vertical axis with a fluid flow channel receiving a portion of the disc for directing fluid across and parallel to the disc to cause rotation of the same with means for sensing rotation of the disc and providing a representation of a predetermined time delay, fluid pulse count, and continuous fluid flow integration as well as other functions.

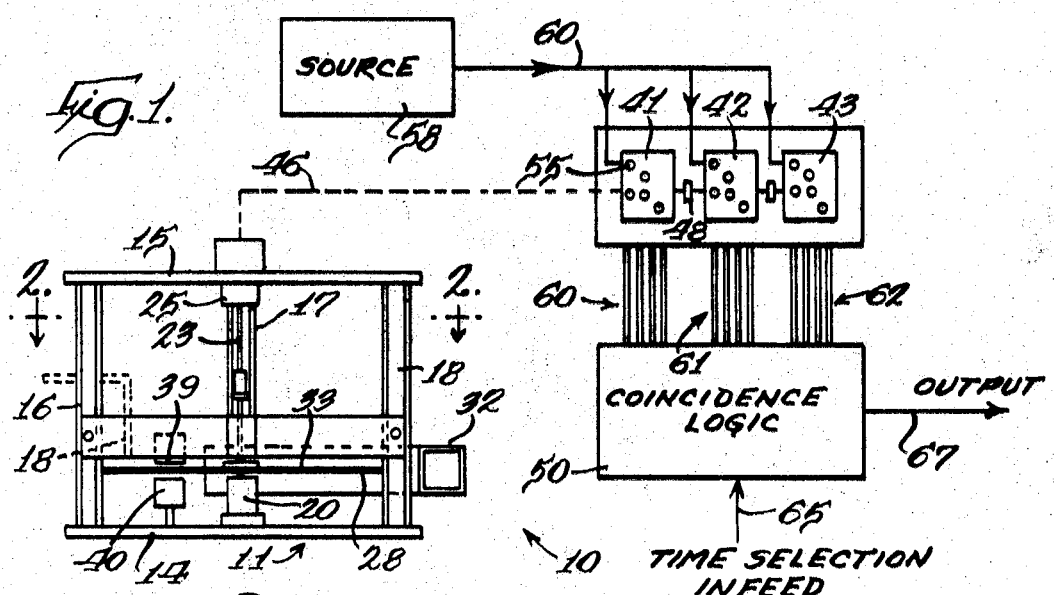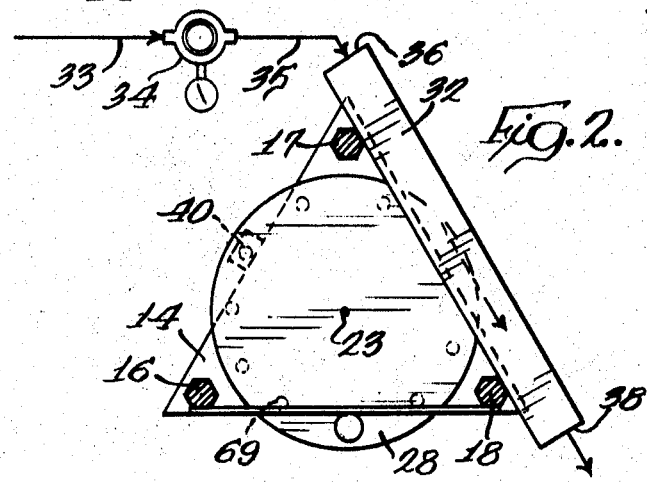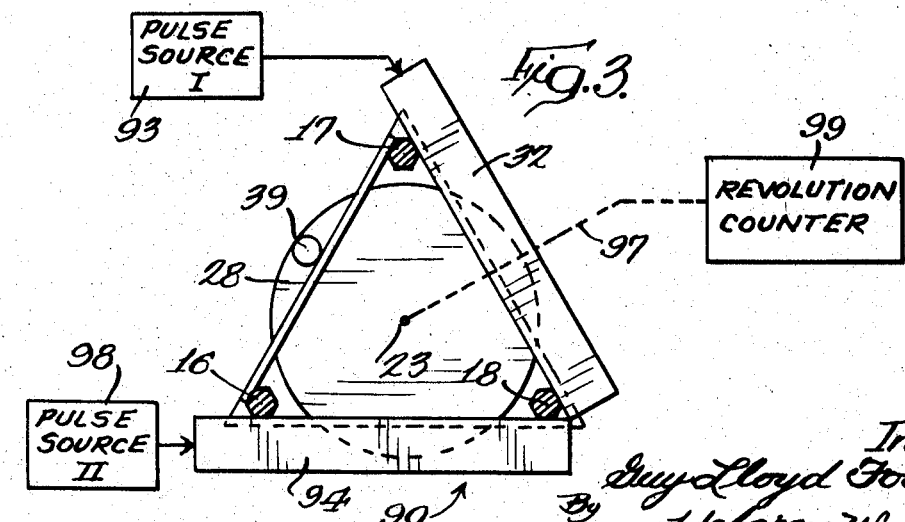

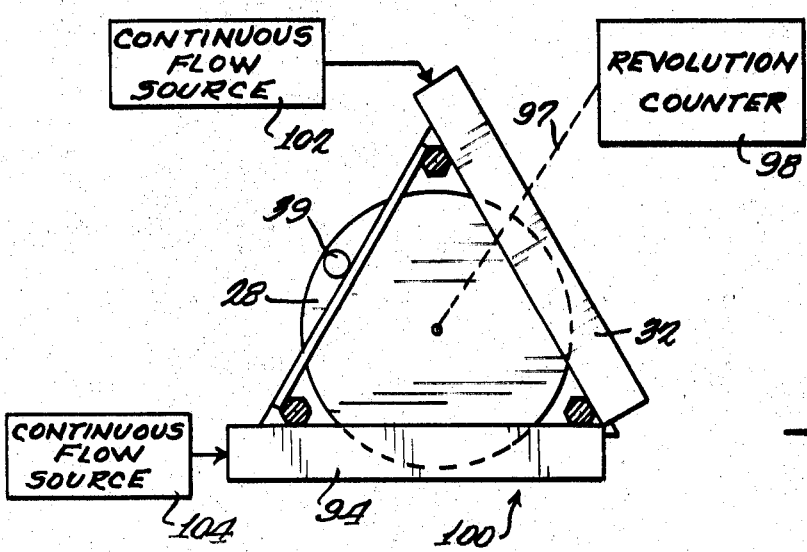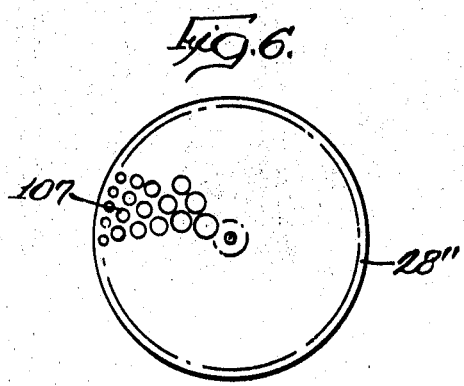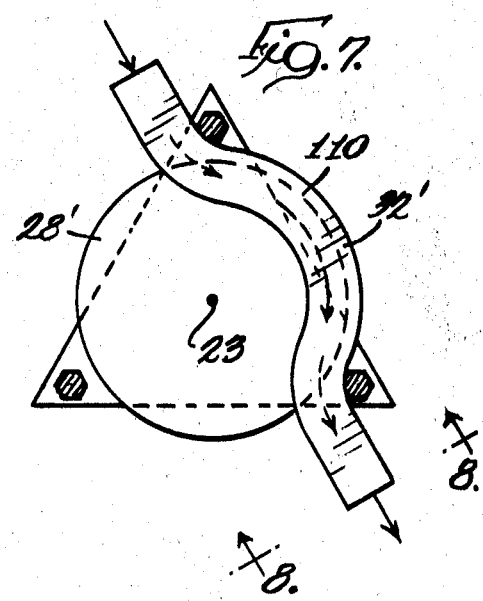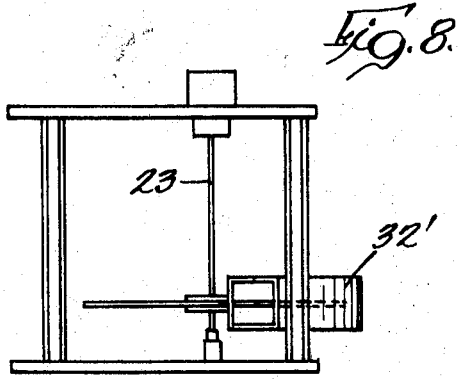

3,557,358

FLUID INTEGRATING DEVICE

BACKGROUND OF THE INVENTION

In the past, the mathematical analysis of fluid flow parameters or fluid pulses in a channel have been performed by extremely complicated devices. Most recently fluidic devices have been developed to perform the functions of amplification and switching, but these devices have limitations in parameters such as gain, linearity, bandwidth, etc. The present invention contemplates a parameter determining device or broadly a fluid integrator which may be used in fluidic circuits or used in conjunction with electrical systems.

SUMMARY OF THE INVENTION

In accordance with the present invention, a shaft is suspended by means of a magnetic bearing. A disc is rigidly fixed to this shaft and the assembly is free to rotate with the disc positioned in a horizontal plane. An air stream is applied to the disc through a slotted rectangular tube positioned such that it contains part of the disc's periphery. With suitable velocity damping the disc's rate of rotation can be varied from 1.7 hours per revolution to about one-third second per revolution. This provides a timing ratio in excess of 10,000:1 despite the fact that velocity damping is provided. Since the drag forces on the disc are proportional to $\rho V^2$, where $\rho$ is the density of the fluid and $V$ is the velocity of the fluid, the device yields a range of 100:1 in terms of volume flow. As will appear hereinbelow, by the suitable connection of various input and output devices, the present device can be used as a fluid signal timer, a pulse counter or integrator, a continuous flow integrator, as well as other uses.

BRIEF DESCRIPTION OF THE DRAWINGS

Further objects and advantages will become apparent from the following detailed description taken in connection with the accompanying drawings in which:

FIG. 1 is a schematic representation of the present device employed as a timer;

FIG. 2 is a top elevation of a portion of the fluid flow device in FIG. 1;

FIG. 3 is a top elevation of the present device employed as a fluid pulse counter;

FIG. 4 is a schematic illustration of the present device adapted to provide integration of a continuous flow source;

FIGS. 5 and 6 are views of two modified forms of the disc shown in FIGS. 1 to 4;

FIG. 7 is an alternate construction of the fluid flow channel; and

FIG. 8 is a side view taken generally along line 8-8 of FIG. 7.

While I have shown and shall hereinafter describe embodiments of the invention, it is to be understood that it is capable of many modifications. Changes, therefore, in the construction and arrangement may be made without departing from the spirit and scope of the invention as defined in the appended claims.

DETAILED DESCRIPTION OF THE PREFERRED EMBODIMENTS

In the FIGS. 1 and 2 embodiments, the present flow device is shown in a fluidic timer 10. While there are many uses for the timing device, one application is as a substitute for the capacitor in a fluidic system. Presently capacitors in fluidic systems take the form of enclosed containers with the filling time of the container representing the charging time of the capacitor, and obviously if long time delays are required an extremely large and cumbersome capacitor must be employed. The present timing device can provide almost unlimited time delays from less than one-third of a second to hours and even years by the suitable provision or cascading of output registers.

As shown in FIG. 1, a rotating disc assembly 11 is provided having triangularly shaped lower and upper frame members 14 and 15, respectively, rigidly separated by three equally spaced vertical supports 16, 17 and 18, each fixed by suitable means (not shown) to the upper and lower frame members 15 and 14.

Fixed centrally on the lower support 14 is a magnetic bearing assembly 20, by itself of conventional construction, which supports the lower end of a vertically disposed shaft 23. The upper end of shaft 23 has a needle bearing (not shown) supported in an upper bearing boss 25 fixed to the upper frame member 15. Fixed to the shaft 23 is a circular disc 28 freely mounted for rotation with the shaft in a horizontal plane. The disc 28 may preferably be constructed of metal such as aluminum.

For directing fluid flow in a direction parallel to and across the disc 28 is a rectangular flow channel 32 fixed to the frame members 17 and 18 as shown more clearly in FIG. 2. The flow channel 32 has a slot 33 which closely receives the disc 28 to reduce leakage from the channel 32.

A suitable source of fluid, such as air, is provided through line 33, through a flow control valve 34 and from the control valve through line 35 to the entrance end 36 of flow channel 32. The flow in the channel is directed across both the upper and lower surfaces of the disc 28 causing rotation thereof and exits from the flow channel 32 at exit end 38.

Velocity damping of the disc assembly is provided by permanent magnets 39 and 40 suitably fixed with respect to the frame and suspended above and below the disc 28. These magnets provide a damping torque proportional to the angular velocity of the disc 28 and define the magnitude of the reaction torque at any angular rate of rotation of the disc 28 larger than the threshold value of stalling.

Decimal digit wheels 41, 42 and 43 are driven by the shaft 23 through suitable reduction gearing 46. As is well known in visual digit registers, each digit wheel is driven by series gearing such as at 48 by the prior wheel. Rather than providing a visual representation, the digit wheels 41, 42 and 43 provide a fluidic binary readout to a coincidence logic circuit 50. Each of the wheels has apertures 55 about the periphery thereof arranged in binary form with each wheel representing a decimal place. A source of fluid 58, such as air, provides a fluid supply through line 60 to the fluidic digit wheels and depending upon the extent of rotation of the disc 28 the wheels provide a binary output through binary group lines 60, 61 and 62, respectively to the coincidence logic circuit 50. A suitable time selection infeed 65 is provided which may be either fluidic, electrical or mechanical, which establishes the coincidence logic circuit to provide an output in line 67 when the desired combination of outputs is provided from group lines 60, 61 and 62. Such coincidence logic circuits are by themselves well-known in the fluidic art.

Variations in the timing is provided by controlling the flow through the valve 34 and hence the timer may be calibrated as desired. If, for example, there were a 100:1 gearing of a worm wheel and worm between the disc shaft 23 and the first motion of the decimal register associated with digit wheel 41, a range of delays between 10 and 10,000 seconds may be simply provided. The range of delays may be increased by a varying the number of decimal wheels.

As an alternative to the provision of the binary register wheels 41, 42 and 43, the rotations of disc 28 may be sensed by a proximity sensor which may take the form of one or more tubes 68 shown in dotted lines in FIG. 1. The tube 68 is positioned in alignment with a plurality of radially aligned apertures 69 (see FIG. 2) in the periphery of the disc 28. By supplying fluid to the proximity sensor, the changes in back pressure therein as the apertures or holes 69 pass thereby provide a fluidic signal that may be employed with suitable associated fluidic counting circuitry to provide an effective timing device. There may be provided independent sensing circuits for each digit desired. Moreover, to minimize unwanted reaction of the disc from the sensing circuit, there may be provided two proximity sensors, one above and one below the disc although this is not shown in the drawings. Where a plurality of proximity jets are provided, they may be staggered such that one is effectively passing a hole as the other enters a hole.

The addition of a flip-flop to each of the sensing circuits (where a single fluidic signal is provided per revolution of each of the wheels 41, 42 and 43 by having only a single aperture in each of these wheels or other equivalent means) converts the device into a variable frequency clock pulse generator.

As shown in FIG. 3, the present device may be employed as a pulse integrator or counter 90 with certain modifications. The basic disc assembly is the same as the timer shown in FIG. 1 so that the reference numerals applied to similar parts have been employed in both embodiments. Instead of the flow channel 32 being connected to a continuous supply of fluid, in the pulse counter 90 the flow channel 32 is connected to a pulse source 93. Also provided is an additional flow channel 94 identical in construction to the flow channel 32, but positioned to receive a different peripheral portion of the flow disc 28. A secondary pulse source 98 is provided that is connected to supply fluid pulses, such as air, to the flow channel 94.

The shaft 23 is connected through a suitable mechanical gearing 97 to a revolution counter 99 which measures the extent of angular movement of the disc 28. A magnetic damping assembly 39, 40 is provided to effect magnetic damping as in the FIG. 1 timing embodiment. Revolution counter 99 may provide a readout as desired.

In operation the revolution counter 99 can count pulses accurately from either the pulse source 93 or 98 and provide either a visual fluidic or electrical representation of the total number of pulses from either of the pulse sources. Moreover, the device may be used as a "countup-countdown" register simply by counting up the pulses from one source and counting down the pulses from the other which may be controlled by suitable feedback device.

Alternatively the pulse counter of FIG. 3 can be used to differentiate the pulses from pulse source 93 and pulse source 98 since they tend to produce opposing forces on the disc 28. Of course, the revolution counter 99 would have to be modified to accept reverse rotation from mechanical gearing 97 to accommodate such a function.

An analogue integrator 100 shown in FIG. 4 is similar in construction to the pulse counter shown in FIG. 3 so that the same reference numerals have been applied in both embodiments where applicable. In the analogue integrator, however, the flow channel 32 received a continuous flow of fluid from a first fluid source 102 while the second flow channel 94 receives a continuous flow of fluid from source 104, although each source need not be supplying fluid to the associated channel at the same time.

In operation with only the source 102 being operational, the device operates as an analogue integrator of the fluid flow from that source. If both sources 102 and 104 are in operation, the device operates as a differential integrator.

In the analogue integrator shown in FIG. 4, the fluid flow velocity from the sources 102 and 104 are large relative to the peripheral velocity of the disc 28. Moreover, the flow in channels 32 and 94 is in the laminar flow range, i.e. Reynolds numbers not much larger than 500. The volume rate and pressure drop are linearly related, and these appear to be proportional to the torque applied by the fluid to the disc.

In some cases it may be desirable to vary the damping torque provided by the damping magnets 39 and 40 on the disc 28. One method of varying this damping torque is to provide a suitable means (not shown) for radially shifting the damping magnet assembly with respect to the disc 28. However, it can be shown that the damping torque provided by the magnet assembly is proportional to the radius squared, i.e. the radius of the magnet assembly squared so that the radial movement of the magnet assembly will normally provide a nonlinear change in damping torque. To linearize the relationship between torque change and radius change, the disc 28 may be geometrically tapered and such a construction is designated 28' in FIG. 5. The tapering of the disc has the effect of making the magnets "see" a varying volume of the disc and since the damping torque is a linear function of disc volume by making the volume vary geometrically with radius, the nonlinear relationship between torque and radius can be eliminated.

An alternate to tapering the disc as shown in FIG. 5 is to provide apertures 107 in the disc 28" as shown in FIG. 6 having diameters that vary as a function of radius so that again the magnets "see" a volume that varies with radius.

There do exist some nonlinearities in the present device over certain disc speed ranges as well as flow and pressure ranges, but there are ways of compensating for such nonlinearities. One method is shown in FIGS. 7 and 8 where the flow channel 32' is provided with an arcuate portion 110 concentrically disposed about the axis of rotation of shaft 23. The effect of this is to direct the flow in channel 32' tangentially with respect to the disc 28' rather than chordally.

While we have described several preferred embodiments of the above invention, it should be understood that there are applications, although possibly less desirable, for the present fluid driven disc assembly.

I claim:

1. A fluid flow device comprising a disc member having an unobstructed viscous drag surface, means for mounting said disc member for rotation about a substantially fixed axis, channel means for directing fluid across said disc in a plane perpendicular to the axis of rotation, said channel means being arcuate across said disc member and having an inlet and outlet directing flow into said plane, and sensing means for sensing rotation of said disc and providing an indication of one or more parameters of said fluid.

2. A fluid flow device as set forth in claim 1, wherein said means for directing fluid includes a flow channel through which at least a portion of the disc passes, the flow channel having an arcuate portion substantially concentric with said axis of rotation to increase the linearity of the device.

3. A fluid flow device comprising: a disc member, means for mounting said disc member for rotation about a substantially fixed axis, means for directing fluid across said disc in a direction perpendicular to the axis of rotation, and magnetic damping means for providing a speed reducing damping force on said disc proportional to the rotational velocity of the disc.

4. A fluid flow device as set forth in claim 3, wherein said disc has a decreasing cross-sectioned volume with radius to provide a substantially linear damping torque with changes in radius of the damping means.

5. A fluid flow device comprising: a disc member, means for mounting said disc member for rotation about a substantially fixed axis, means for directing fluid across said disc in a direction perpendicular to the axis of rotation, and damping means for providing a damping force on said disc proportional to the rotational velocity of the disc, said disc having a decreasing cross-sectioned volume with radius to provide a substantially linear damping torque with changes in radius of the damping means, said decreasing cross-sectional volume of the disc being provided by apertures in the disc having radii that vary with the radius of the disc.

6. A fluid flow device comprising: a disc member, means for mounting said disc member for rotation about a substantially fixed axis, means for directing fluid across said disc in a direction perpendicular to the axis of rotation, damping means for providing a damping force on said disc proportional to the rotational velocity of the disc, said disc having a decreasing cross-sectioned volume with radius to provide a substantially linear damping torque with changes in radius of the damping means, and radial decreasing cross-sectional volume being provided by a decreasing axial length of the disc with increasing disc radius.

7. A fluid pulse counting device, comprising: a disc member, means for mounting said disc member about a substantially fixed axis of rotation, means for directing fluid across said disc in a direction perpendicular to the axis of rotation thereof, a source of fluid pulses, means connecting said source of fluid pulses to said fluid directing means, and sensing means responsive to the rotation of said disc for providing a representation of the number of fluid pulses.

8. A fluid pulse counting device as set forth in claim 7, and further including second means for directing fluid across a separate portion of said disc members substantially perpendicular to the axis of rotation thereof, a second source of fluid pulses, and means connecting said second source of fluid pulses to said second directing means whereby said sensing means may provide a representation of the algebraic difference in number of pulses from said first and second pulse sources.